United States Patent [19]

Floyd et al.

[11] 3,996,310
[45] Dec. 7, 1976

[54] POLYMERS CONTAINING NON-EXTRACTABLE/NON-VOLATILE ADDITIVES AND PROCESSES FOR THEIR PREPARATION

[75] Inventors: Joseph C. Floyd; Don A. Plank, both of Baytown, Tex.

[73] Assignee: Exxon Research and Engineering Company, Linden, N.J.

[22] Filed: Aug. 1, 1975

[21] Appl. No.: 600,994

Related U.S. Application Data

[63] Continuation of Ser. No. 501,723, Aug. 29, 1974, abandoned, which is a continuation of Ser. No. 240,463, April 3, 1972, abandoned.

[52] U.S. Cl. .................. 260/878 R; 260/876 R; 260/879
[51] Int. Cl.² .......................................... C08L 23/00
[58] Field of Search ............... 260/878 R, 876 R

[56] References Cited

UNITED STATES PATENTS

| 3,177,269 | 4/1965 | Nowak et al. | 260/878 R |
| 3,177,270 | 4/1965 | Jones et al. | 260/878 R |
| 3,270,090 | 9/1966 | Nowak | 260/878 R |
| 3,652,730 | 3/1972 | Favie et al. | 260/878 R |
| 3,696,069 | 10/1972 | Schrage et al. | 260/878 R |
| 3,699,186 | 10/1972 | Schrage et al. | 260/878 R |
| 3,701,751 | 10/1972 | Schramm et al. | 260/41 AG |
| 3,914,203 | 10/1975 | Lee | 260/878 R |

FOREIGN PATENTS OR APPLICATIONS

| 742,340 | 11/1969 | Belgium | 260/878 R |
| 1,042,178 | 9/1966 | United Kingdom | 260/94.9 GD |

*Primary Examiner*—J. Ziegler
*Attorney, Agent, or Firm*—David A. Roth

[57] ABSTRACT

Derivatives of grafted polymers are prepared in solvent phase. The resulting products, which can be tailor-made in terms of certain properties impart, when used in relatively small quantities, certain additive functions to the properties of other polymers or the modified products of the invention can be used by themselves per se for conventional plastic uses.

1 Claim, 2 Drawing Figures

POLYMERS CONTAINING NON-EXTRACTABLE/NON-VOLATILE ADDITIVES AND PROCESSES FOR THEIR PREPARATION

This application is a continuation of Serial No. 501,723, filed Aug. 29, 1974, abandoned, which in turn is a continuation of Ser. No. 240,463, filed Apr. 3, 1972, abandoned.

BACKGROUND OF THE INVENTION

Commercial plastics and elastomers are polymeric materials which have been employed in a wide variety of uses. These can be generally classified as being thermoplastic, elastomeric or thermoset. There are literally dozens and perhaps even hundreds of polymers which have present commercial value or potential commercial value.

Many if not most of these polymers have defects or disadvantages which detract from the desired full spectrum of properties to be possessed by a polymer for a given purpose.

Therefore, it has become conventional and even a very highly sophisticated practice to incorporate various additive maerials in these polymers in order to improve the polymer in a particular property or to neutralize or blunt the effect of a serious defect in a polymer characteristic.

There are wide varieties of such additives. They include such things as anti-oxidants, anti-statics, colorants, flame-retardants, heat stabliziers, lubricants, plasticizers, preservatives, processing aids, UV absorbers, and the like.

Additives in order to be effective must be capable of being mixed throughly with the particular plastic to be improved, i.e., the additive must be compatible with the polymer. Desirably, the additive should be non-extractable from the polymer matrix. That is, the environment in which the plastic is used should not adversely remove the additive from the polymer. For instance, a polymer which is going to be used in a dishwashing machine should not have additives which are extracted easily with the action of hot soapy water.

Also, additives should have the property of being non-volatile. Thus, at the temperatures of processing, i.e. extrusion and molding, the additives must not be volatilized out of the polymer matrix at these temperatures. Furthermore, the additives must be relatively heat stable so that at these temperatures they do not tend to degrade. Thus, for many additives the quality of being non-migratory is highly desirable.

Most of the additives conventionally used by the prior art are deficient in these characteristics.

Even when grafted polymers have been modified, the process has not been solvent phase and the object has not been the preparation of additives.

Japanese application Nos. JA 16396/68, 16395/68, 16393/68, 16392/68, 7348/69, 7347/69, 7346/69, 7345/69, 2719/69, 2718/69, 2717/69, 2716/69, 2715/69, 2714/69, 21493/69, 21492/69 represent art of some interest.

RELATED APPLICATIONS

This application is a continuation of earlier applications. However, it is related somewhat and an improvement in subject matter to applications by different inventors which have been assigned to the same assignee and which are co-pending.

SUMMARY OF THE INVENTION

Various derivatives of functionally grafted polymers which are preferably prepared in solvent phase, especially melt phase, can be used in relatively small quantities as outstanding polymer additives or utilized per se for various polymer end-uses. The derivatives can be prepared by a solvent or melt-phase post-grafting reaction or can be effected by simultaneously grafting and modifying in the same reaction zone in melt phase, e.g. within an extruder reactor.

DETAILED DESCRIPTION OF THE INVENTION

Figure 1:
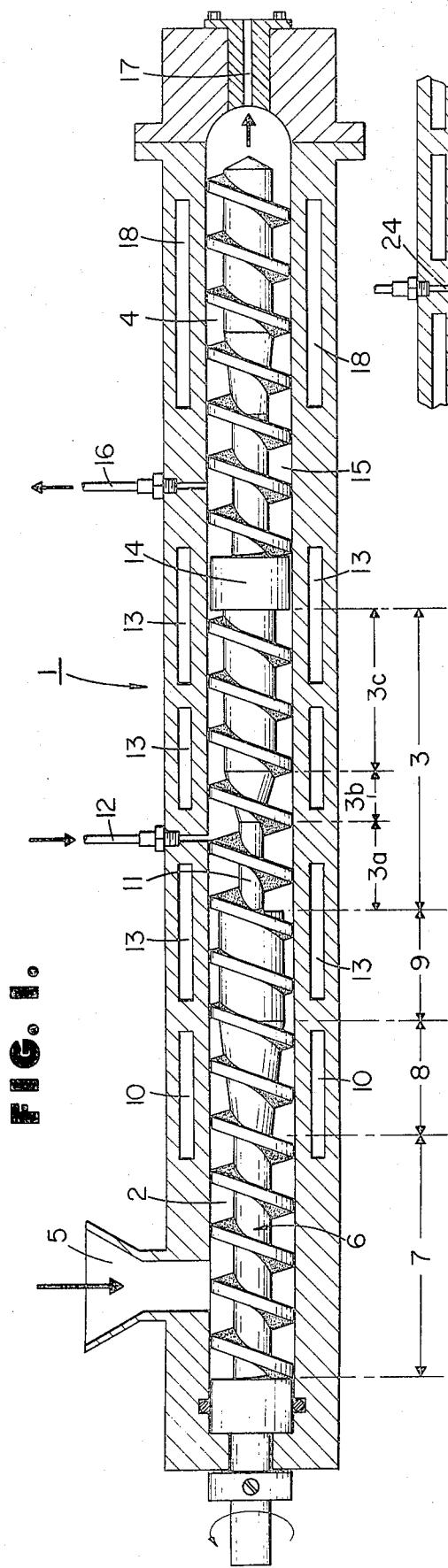

It has now been discovered and forms the substance of this invention that novel polymeric compositions can be prepared by appropriate subsequent modification of a grafted polymer. The modification can take place simultaneously and contemporaneously with the grafting reaction. Or alternatively, the modifications can be effected by subsequent modification of the grafted polymer. In any event, the modification preferably takes place in solvent phase, preferably melt-phase. In effect, the polymer which is being modified is providing its own solvent, by being in the melt phase.

In one embodiment of the invention, the grafted polymers of the invention are tailor-made so as to have outstanding utility as additives for other polymeric compositions, and thus possess the conventional additive functions. Additive functions such as oxidation stabilizer, anti-oxidant, anti-static agent, colorant, flame-retardant, heat stabilization, lubricant, plasticization, preservatives, processing aids, UV stabilizers, and the like can be chemically introduced into a given polymer so that it can be used per se and retain such properties.

And even more preferably the post modified graft products of the invention can be used in small quantities as an additive which is outstandingly compatible with the base polymer, essentially nonextractable and essentially non-volatile.

Thus, the additives of the invention have outstanding utility in improving the deficiencies of a given polymer while at the same time imparting aspects of compatibility, non-extractibility and non-volatility which are usually a problem with additives, even though the functionality of the additive is adequate to overcome the base deficiency. Further, the additives of the present invention are immune to the adverse effects of their environments under conditions for which conventional additives would be at a disadvantage because of their lack of compatibility, their tendency to be extracted, and their volatility.

Very generally, the concept of the invention contemplates the obtaining or formation of graft polymers in which the graft is a functional monomer such as carboxylic acid, followed by the modification of the carboxylic acid to form special esters, salts, amides, polyethers, nitriles, thioderivatives, glycidol derivatives, cyano derivatives, hydroxy, glycol and other derivatives thereof.

Although the functional monomers which are grafted onto the backbone of the base polymer are preferably $C_3$ to $C_{10}$, preferably $C_3$ to $C_6$, unsaturated carboxylic acids, e.g. most preferably monocarboxylic acids, di and other polycarboxylic acids can be used.

Also, derivatives of such acids such as salts, esters, ethers, amides, nitriles, thio compounds, glycidol compounds, cyano compounds, hydroxy compounds, glyco compounds and other simple substituted derivatives thereof, can be used for forming the initial grafts.

However, for purposes of illustrating the preferred embodiment, all subsequent discussion will be with respect to monocarboxylic acid grafts and their derivatives. However, the invention is not so narrowly limited.

The base polymers that can be utilized in the invention include all polymers in which grafts of the type described above can be formed. Preferably it includes all polymers which are capable of being processed in an extruder. It particularly includes elastomers and thermoplastics, such as nylons, polyesters, polycarbonates, engineering plastics, and acytals. It is especially useful for $C_2$–$C_8$, preferably $C_2$–$C_5$ polyolefins, including copolymers of olefins with other monomers, such as vinyl monomers in which the predominant constituent is the olefinic component.

Examples of elastomers include natural rubber, polyisobutylene, butyl rubber, chlorobutyl rubber, polybutadiene, butadiene styrene, ethylene-propylene elastomers, ethylene-propylene diene terpolymer elastomers, mixtures thereof with each other and with thermoplastic polymers.

Blends of elastomers and plastics in any portions particularly can benefit from being grafted and modified by the technique of the invention.

Although the primary feature of the invention is the modification of a grafted polymer in order to form highly effective additive materials, it is also possible to directly graft monomers to the polymer backbone so that each graft consists of only one monomer rather than polymers. One way of accomplishing this is to provide an unsaturated site accompanied by stearic hindrance or bulkiness factors in the monomer itself so that only one monomer will graft onto any one reactive site.

Graft polymers which will operate suitably in the compositions of the invention as intermediates from which the derivatives of the invention can be made are described, in the art. See, for instance, those to be found in U.S. Pat. Nos. 3,177,269; 3,177,270; British Pat. Nos. 1,217,231; 679,562 and the like.

The preferred modifying monomers which are grafted to the backbone are $C_3$ to $C_{10}$, preferably $C_3$ to $C_6$, unsaturated mono- and polycarboxylic-containing unsaturated acids with preferably at least one olefinic unsaturation, and hydrides, salts, esters, ethers, amides, nitriles, thio, glycidyl, cyano, hydroxy, glycol, and other substituted derivatives thereof.

Examples of such acids, anhydrides and derivatives thereof include maleic acid, fumaric acid, iticonic acid, citronic acid, acrylic acid, glycidyl acrylate, cyano acrylate, hydroxy methacrylate, acrylic polyethers, acrylic anhydride methacrylic acid, crotonic acid, isocrotonic acid, mesaconic acid, angelic acid, maleic anhydride, itaconic anhydride, citratronic anhydride, acrylonitrile, and methyacrylo nitrile.

Other monomers which can be used either by themselves or in combination with one or more of the carboxic acids or derivatives thereof include $C_8$ to $C_{50}$ vinyl monomers such as monovinyl aromatic compounds, i.e. styrene, chlorostyrenes, bromostyrenes, $\alpha$-methyl styrene and the like.

Other monomers which can be used are $C_{10}$ to $C_{50}$ vinyl esters and allyl esters, such as vinyl butyrate, vinyl laurate, vinyl stearate, vinyl adipate and the like, monomers having two or more vinyl groups, such as divinyl benzene, ethylene dimethyacrylate, triallyl phosphite, dialkylcyanurate and triallyl cyanurate.

Nevertheless, the most outstanding results and the highly preferred embodiments of this invention are those in which the graft copolymer meets some highly specific criteria. Primary is the concept that the graft copolymer not only contain grafted active functionality but that the backbone polymer itself be reduced considerably in melt flow so that it is more compatible with other components in the total composition and also exerts a much more powerful additive and synergistic influence on the overall composition.

CHARACTERISTICS OF THE PREFERRED GRAFTED POLYMER TO BE USED AS A BASE FOR SUBSEQUENT MODIFICATION

The graft polymer of the invention can be characterized in several respects. These are:

1. A melt index or MFR of from 1 to 1,000 preferably 10 to 250, most preferably 10 to 100 and most preferably at least 25% or more, usually 50% or more, and most preferably 200% higher than the melt index of a starting polymer (base polymer) having a melt index of from no-flow to 50 as measured under conditions of A.S.T.M. test No. D-1238-65T.

2. A graft comonomer content of from 0.1 to 50, preferably 1 to 25 and most preferably 2 to 10, based on the total weight of the graft copolymer.

3. A die swell at least 0.05 and preferably 0.1 of a unit less than that of the base polymer.

In an especially preferred embodiment, the present invention is directed to the use of a grafted polymer of a $C_2$–$C_8$ $\alpha$-olefin or its copolymers with arcylic acid. The polymers of $C_2$–$C_8$ $\alpha$-olefins are commonly referred to as polyolefins and for the purpose of this invention are to include copolymers of the $C_2$–$C_8$ $\alpha$-olefins with each other and with other monomers as well as the homopolymers.

Polymers containing diolefins such as butadiene and isoprene are also suitable. The polyolefins are produced utilizing in most instances a Zeigler-type catalyst, but can also be Phillips catalysts and high pressure technology. The processes for making the $C_2$–$C_8$ polyolefins are well known and form no part of the present invention.

Examples of suitable polyolefins, both plastic and elastomeric, include low or high density polyethylene, polypropylene, polybutene-1, poly-3-methyl-butene-1, poly-4-methylpentene-1, copolymers of monoolefins with other olefins (mono- or diolefins) or vinyl monomers such as ethylene-propylene copolymer or with one or more additional monomers, i.e. EPDM, ethylene/butylene copolymer, ethylene/vinyl acetate copolymer, ethylene/ethyl acrylate copolymer, propylene/4-methylpentene-1 copolymer and the like.

The term "copolymer" includes two or more monomer constituents and substituted derivatives thereof.

The preferred polyolefins employed in the present invention contain propylene and/or ethylene, i.e. polypropylene and polyethylene. The polymer used as a base material in the present invention will preferably have a melt index of 0.1 to 50, preferably 5 to 20 or melt flow rate (MFR) between about 0.1 and 20 and, preferably, 0.2 and 5.0, most preferably 0.5 to 2. These melt flow rates correspond approximately to viscosity average molecular weights of between 2,000,000 to 100,000.

In the preparation of normally solid polymers of 1-olefins, certain rheological properties are frequently utilized for control purposes. One of these rheological properties more usually employed is melt index or melt flow rate which characterizes the processability of the polymers and is also an indication of polymer molecular weight.

The melt index of polyethylene is measured normally according to the A.S.T.M. test No. D-1238-57T. In this test the rate of extrusion in grams per 10 minutes (through an orifice 0.0825 inch in diameter and 0.315 inch in length) is determined for the polymer at 190° C. under the weight of a piston having a diameter of 0.373 inch and weighing 2,160 grams.

The melt flow rate (MFR) of polypropylene is determined by the same procedure except at a temperature of 230° C. according to A.S.T.M. D-1238-57T condition L (from 1962 A.S.T.M. preprint). The apparatus utilized for determining melt index is defined in A.S.T.M. manual as a "dead-weight piston plastometer."

As used in the following discussion, the term melt index includes melt flow and vice-versa and defines the polymer property determined according to the procedure set forth in A.S.T.M. D-1238-57T and from the 1962 A.S.T.M. preprint at the temperature and pressure appropriate to the polymer.

The preferred monomers to be grafted to the $C_2$-$C_8$ polyolefin and other polymers according to the present invention are maleic anhydride, acrylic acid, methacrylic acid, glycidyl acrylate, hydroxy methacrylate and their derivatives. Others that can be used are described elsewhere. However, other monomers may be added in admixture with these such as maleic anhydride, styrene and the like to form graft copolymers.

The preferred grafting reaction is initiated by a free-radical initiator which is preferably an organic peroxygen compound. Especially preferred peroxides are t-butyl benzoate, dicumyl peroxide, 2,5-dimethyl-2, 5-di-tert-butylperoxy-3-hexyne (Lipersol 130), $\alpha,\alpha'$-bis(-tert-butylperoxy)diisopropyl benzene (VulCup R), or any free radical initiator. Having a 10-hour half-life temperature over 80° C. or mixtures thereof. Generally, the higher the decomposition temperature of the peroxygen compound, the better. See pp 66–67 of *Modern Plastics*, November 1971, which is incorporated hereby by reference for a more complete list of such compounds.

A particularly preferred polymer made by a process described and claimed in a co-pending commonly assigned application involves grafting the polymer during the course of an extruder reaction. That process is described as follows.

Figure 3:
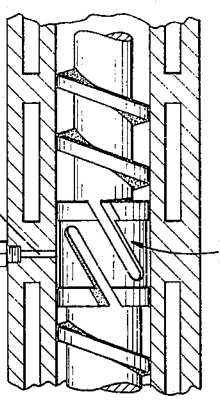
Figure 2:
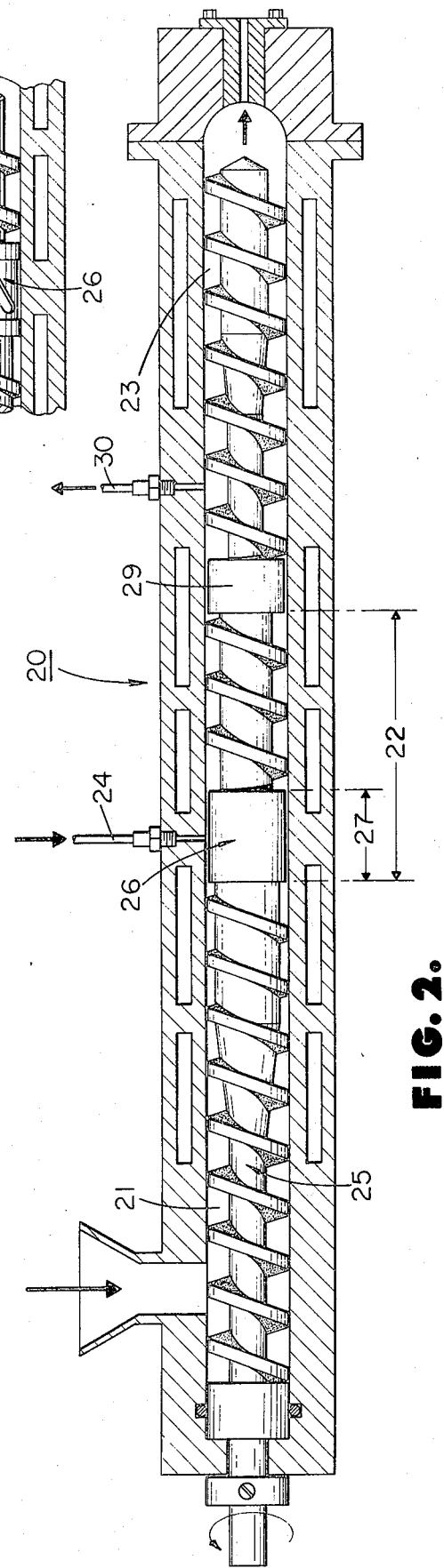

In the accompanying drawings
FIGS. 1 and 2 are extruders for carrying out the invention, and
FIG. 3 is a mixing device.

AN ILLUSTRATIVE EMBODIMENT OF A PREFERRED PROCESS FOR PREPARING INTERMEDIATE GRAFTS FOR THE DERIVATIVES OF THE INVENTION

Referring to FIG. 1, an extruder 1, having a feed zone 2, a reaction zone 3, and a metering zone 4 is utilized to carry out one embodiment of the grafting process of the present invention.

Polypropylene is introduced into a hopper 5 in the feed zone 2 of the extruder 1. The extruder screw 6 in the feed zone 2 can be of various conventional designs such as a feed portion 7, a transition zone portion 8 and a meter portion 9. In the feed zone 2, the polypropylene is heated by heaters 10 to a barrel temperature in the range of 400° to 650° F., preferably 400° to 550° F.

It is one of the advantages of this process that fairly low temperatures can be used to accomplish outstanding modification. In processes utilizing $O_2$ as an initiator, much higher temperatures, i.e. about 675° to 800° F. are required and control is very difficult.

Extruder screw 6 has a root (sometimes called core) starting at the initial boundary reaction zone 3 with a reduced cross-sectional area 11. This provides additional volume for reaction zone 3. When polymer under pressure reaches zone 3, the decreased volume causes a pressure drop, i.e., decompression.

An injection line 12 connects reaction zone 3 to a source of initiation, preferably a peroxide, and/or reactive monomer. For the purposes of this specific embodiment, the monomer is acrylic acid and the initiator is VulCup R.

Injection of initiator at this point where low pressures in zone 3 prevail provides thorough mixing of the initiator and polypropylene in an extremely short period of time and appreciable degradation of the polypropylene. Appropriate controls of the polypropylene feed rate and screw speeds are maintained.

Preferably, the initiator and acrylic acid are added as a liquid blend to zone 3. When only degradation is desired, initiator alone is introduced into zone 3.

It has been found that appreciable degradation of the polypropylene occurs when the back pressure against the liquid mixture of initiator and acrylic acid in injection line 12 is less than about 100 psi. Best results are obtained when the back pressure, i.e., the pressure in excess of a fixed pressure at which the initiator and acrylic acid are forced into the extruder 1, is substantially zero.

The pressure in injection line 12, therefore, provides one indicia that the polypropylene feed rate and screw speed are being appropriately controlled for the particular products desired.

The preferred graft copolymers of this process exhibit appreciable degradation as compared to the base polymer. This is demonstrated by the fact that the graft copolymers of the invention have a lower die swell than the polypropylene base stock used in making the copolymer.

The portion of the extruder heated by heaters 13 will have a temperature of from about 160° to 450° F., preferably 250° to 350° F. The extruder screw 6 in the latter portion of reaction zone 3 can have any desired cross-sectional area desirable to provide for ancillary mixing if desired and to allow residual reactants to complete their reaction.

It is to be noted that some homopolymerization of the acrylic acid (or any other monomer) to form polyacrylic acid also occurs. But this usually does not exceed 30% of the total acrylic polymer formed.

Preferably, the decompression portion 3a of the screw is immediately followed with transition zone 3b of gradually increasing screw root cross-sectional area, followed by a metering zone 3c of constant cross-sectional screw root area.

Thereafter, extruder screw 6 has a melt seal or blister 14 which prevents the free escape of initiator and acrylic acid from reaction zone 3.

Screw 6 also has a second decompression portion 15 following blister 14.

Vent line 16 (which can be optionally provided with vacuum, if desired) is positioned above decompression portion 15 to remove any gases or vapors.

The graft copolyner and homopolymer blend is then passed through metering zone 4 where it is extruded from a die 17 at the end of extruder 1.

The extruder barrel temperature heated by heaters 18 in metering zone 4 is in the range of 350° to 550° F., preferably 350° to 450° F.

Referring to FIG. 2, extruder 20, having a feed zone 21, a reaction zone 22 and a metering zone 23, is also utilized to carry out the preferred grafting process. The process is generally similar to that described above for FIG. 2, except as follows.

In this embodiment, the initiator and acrylic acid are injected through injection port 24 at a point where the extruder screw 25 has a root of very large cross-sectional diameter 26 (also referred to as mixing device 26) so that the clearance between root segment 26 and the interior of extruder 20 is very small and will vary with extruder size.

In this preferred 2 inch Egan extruder apparatus of the invention, this clearance is from 5 to 50, preferably 10 to 25, and best 10 to 20 mils.

In another preferred embodiment shown in FIG. 3, the mixing device 26 is shown with a series of channels cut in the perimeter of the device. This results in a series of dead-end channels, which forces the polymer out of the inlet channels and across the outer surface to the outlet channel.

In any event, whether the embodiments of FIG. 2 or FIG. 3 are used, the polymer outlet velocity is increased and forms a thin fluid film under relatively high shear as compared to the other portions of the extruder.

The initiator and/or acrylic acid are injected at pressures which may range between 1300 and 5000 psi or more, specifically between 1500 and 3000 psi. At these high pressures and because only a thin film of polypropylene is present at the high shear-thin film zone 27 of reaction zone 26, intensive, instantaneous mixing accompanied by appreciable degradation of the polypropylene occurs.

Extruder 20 is also provided with a blister 29 and a vent 30. As in the case of the FIG. 1 extruder, both the vent and blister may be eliminated if desired.

As illustrated by the two embodiments of FIG. 1 and FIG. 2, various extruder designs may be employed to carry out the graft copolymerization process. However, the common characteristic of each extruder design is that thorough, instantaneous mixing of the initiator and acrylic acid with the polymer, i.e. polypropylene, occurs. The extremely high degree of mixing which characterizes the process is evident by the result that appreciable degradation of the polyolefin is not only shown by the substantial increase in the melt flow rate or melt index of the copolymer over the base resin, but that the die swell of the graft copolymer is lower than the die swell of the polyolefin base stock used in making the copolymer.

DIE SWELL

Some high molecular weight polymers such as polyolefins when forced through a capillary die of a relatively short length produce an extrudate of a larger diameter than the diameter of the capillary.

This property of polymers has been characterized as die swell which is expressed numerically as the ratio of the diameter of the extrudate to the diameter of the capillary (by some to the first power and by others to the second power). The term "die swell" as used herein is defined as follows:

$$\text{die swell} = D_e/D_o^2$$

where:
$D_e$ is the extrudate diameter
$D_o$ is the capillary diameter.

The numerical value of die swell is also dependent on the geometry of the rheometer used to force the polymer through the capillary. In obtaining the numerical values set forth herein, and in the tables which follow, a rheometer having a rheometer barrel of ⅜ inch I.D. (inside diameter) was used wherein the barrel was heated to a temperature controlled to ±2° F. of the recorded temperature and the polymer was forced through a capillary having a 0.03018 inch I.D. and which was 1.006 inches long. The capillary had a 90° entry angle.

The measurements were made by forcing the polymer through the capillary by a plunger operating at a constant speed or a constant shear rate ranging from 13.5 reciprocal seconds to 338.3 reciprocal seconds ($sec^{-1}$). The polymer was forced through the capillary into ambient air at room temperature (70° to 80° F.).

The measurement of die swell is frequently used as a gross measure of molecular weight distribution in polyolefins, high die swell resin possess broader molecular weight distribution than polymers having lower die swells.

Thus, end uses, post-modifications, etc., are disclosed herein which have never been previously described or available to the art. These processes for modifying and using graft polymers are novel and unobvious in their own right, in addition to the novel products per se.

GENERAL REACTION CONDITIONS

The free radical initiator is used in amounts corresponding to 0.01 to 5, preferably 0.05 to 2, most preferably 0.05 to 1.5 weight percent based on monomer. When based on polymer, free radical initiator is used in amounts of 0.0001 to 1, preferably 0.001 to 1, and most preferably 0.001 to 0.5 weight percent.

The monomer to be graft polymerized is used in amounts of 0.1 to 100, preferably 1 to 50, and most preferably 2 to 25 weight percent of the base polymer.

Generally, the monomer and initiator are blended together and added simulaneously, except in the situation of a polyethylene or ethylene predominant copolymer.

Therefore, in the description of the invention as follows, from time to time certain differences in the applicable process conditions must be employed when the primary characteristics of the polymer are determined as a result of its ethylene content.

It is also to be noted that the preferred process is applicable to elastomers of all classes which are capable of being handled by an extruder. Examples include natural rubber, polyisobutylene, butyl, chlorobutyl, polytutadiene, butadiene-styrene, ethlenepropylene, ethylene-propylene diene terpolymer elastomers and mixtures thereof with each other and with thermoplastic polymers. Blends of elastomers and plastics in any portions particularly benefit from being processed by the technique of the invention.

Typical examples showing derivatives embodying the inventive features of the present application can be illustrated by the following:

An acid-grafted polymer can be made into a UV stabilizer by reacting some or all of the carboxy groups with nickel-containing basic salts, e.g. nickel oxide, nickel hydroxide, etc., with the acid groups.

Hydroxy benzophenones containing at least two hydroxy groups can be reacted with the acid groups of a polymer in order to produce a hydroxy benzophenone chemically bound within the polymer which in turn will be active as an ultraviolet stabilizer.

Compounds containing one or more amine functions which are conventionally used as antioxidants e.g. $C_4$ to $C_{50}$ or hindered phenols containing graft polymers can be so reacted to introduce ultraviolet stabilization into the polymer.

Polyols such as sugars, glyceryls, glycols, sorbitals and the like can be reacted with the two carboxy groups of the intermediate graft polymer. Another reactive alcohol is pentaerythritol.

Polyamines, such as hexamethylene-tetramine $(CH_2)_6N_4$, ethylene diamine, p-phenylene-diamines can also be reacted with the carboxy groups of the grafted polymer to form both amide and amine functionality.

The amine and polyolol derivatives described above will have antistatic properties.

Anti microbials can be formed by reacting the carboxy compounds with such tin compounds as bis (tri-n-butyltin) oxide.

Internal plasticization can be obtained by reacting some or all of the carboxy groups with plasticizers which have three or more hydroxy groups. An example of this would be the tri-ethyl citrate or the tri-butyl citrate and such as citroflux 2, citroflux A-2, and citroflux 4 which will import plasticization to the carboxy compounds.

Halogenated aromatics and phosphorous compounds containing amine or hydroxy functionality can be reacted with the carboxy groups to produce compounds which have high internal flame resistance. Also antimony oxides can be added to these derivatives in order to obtain synergistic properties.

Examples of suitable compounds which can be reacted with carboxy groups are tetrabromo bisphenol A, tetrachloro bisphenol A, phosphorous containing polyols.

Derivatives of the grafted polymers of the invention can be used as carriers for PVC, i.e. polyvinyl chloride stabilizers. Generally stabilizers for these compounds are cadmium, zinc, and barium soaps. These soaps, of course, are extractable and are difficult to disperse. The barium, cadmium and zinc salts of the carboxylic acid grafts of the invention can be used as stabilizers in PVC.

The metal salts of the graft polymers can be used in conjugation with conventional organic phosphites such as alkyl and arylophosphates and also can be used in conjunction with epoxy plasticizers. Lead derivatives and organo tin-derivatives of carboxy acid grafts also will be effective for stabilizing PVC.

Generally the barium-cadmium stabilizer system will be used together and will have a relatively high barium content and a relatively low cadmium content and will be combined with organic phosphites. Alternatively, high cadmium-low barium systems which have secondary stabilizers such as phenols and polyols can also be used.

Dialkyl tin derivatives can be reacted with the carboxy grafted materials to produce suitable stabilizers.

The carboxylic acid grafts polymers of the invention also can act as chelants and can chelate traces of heavy metals. Furthermore, also derivatives which are based on a calcium/zinc stabilizer system reacted with the carboxy graphs can be used quite satisfactorily.

Long-chain, fatty acid amines can be reacted with the carboxylic acid to form compounds which are internally plasticized and have lubricating characteristics. Nonmigratory preservatives which help to make plastics resistant to microbials in the form of bacteria algae, yeast, mold and fungi can be made by the process of the invention.

The preferred post modification reaction takes place simultaneously with the grafting reaction in an extruder or just subsequent to the grafting reaction.

Thus, when the polymer is in a molten condition and at an elevated temperature, this reaction can be most conveniently accomplished.

The post modification reactants and promoters, if necessary, can be added through the same conduit as that utilized for adding the grafting monomer or the free-radial catalysts.

Reactants are chosen so as not to be degradable at the temperatures of reaction.

A particularly preferred reaction is that of an amine with acid grafted polypropylene. For instance, a 6 percent acrylic acid grafted polypropylene has been grafted in stoichemetive quantities in pentane solvent (under pressure) and in melt phase with N-octyl-amine to give amides and imides.

When the reaction is carried out in the melt or in pentane solvent, with aniline, the aniline salt is produced. This is subsequently converted to the amide at the higher temperatures of extrusion.

O-aminophenol was also reacted with acrylic acid grafted polypropylene directly in the extruder according to the following reaction:

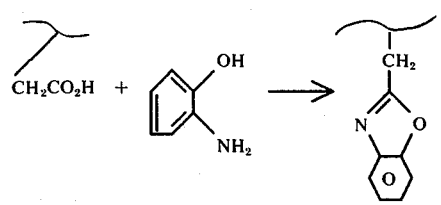

One of the outstanding abilities of the amide derivatives of this invention is to withstand the effects of copper degradation.

Copper tends to accelerate the decomposition of polyolefins. When 0.01 to 20 weight percent of amide group are introduced into the polymer, it becomes stabilized against copper degradation.

This is an extremely important feature when it is desired to use a polyolefin as a copper insulator with a long life, and with non-extractable copper stabilizers.

Other compounds which will perform as copper stabilizers are:

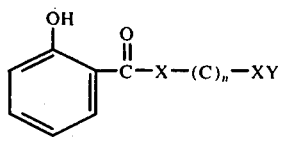

when
X = O, N
n = 1–18

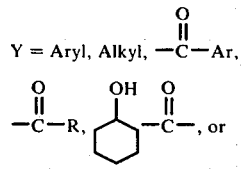

or acid grafted polyolefin as described herein, particularly acrylic grafted polypropylene.

In many electrical applications, solvents, greases, and other hydrocarbon components are used in close proximity to polyolefin conduits.

These components tend to quickly leach out the normally extractable copper stabilizers from the polyolefin matrix.

However, the derivative stabilizers of the invention are not extractable and, therefore, the grafted polyolefins stabilizers can effectively operate in contact with copper and associated solvents without leaching or extraction of copper stabilizers.

Although esterfication reactions can be effected in melt phase, the reaction is somewhat slow and, therefore, cannot be conveniently accomplished in an extruder. But the amine or amine salt reaction is fast and quantitative and can be carried out in an extruder reaction.

EXAMPLE 1

Acrylic acid grafted polypropylene (5.6 weight percent acrylic acid content; 20.0g) was added to a Plasticorder slowly. Stearyl alcohol (4.16 g) and p-toluenesulfonic acid (0.37 g) were then added and the mixture allowed to mix for 15 minutes at 180° to 185° C. The sample was then removed from the apparatus and allowed to cool. Analysis by infrared indicated >90% conversion to the stearyl ester of acrylic acid grafted polypropylene.

EXAMPLE 2

Acrylic acid grafted polypropylene 3.7 weight percent; 20.0 g) was added to a Plasti-corder and allowed to melt. Benzyl alcohol (1.12 g) was then added to the melt and the mixture was allowed to react for 15 minutes at 188° C. Product was removed and allowed to cool. Analysis by infrared indicated approximately 80% transformation to the ester.

EXAMPLE 3

Acrylic acid grafted polypropylene (5.5 weight percent acrylic acid content; 20.0 g) was added to a Plasticorder and brought to a melt. 3-Phenyl-1-propanol (2.09 g) and p-toluenesulfonic acid (0.20 g) were then added to the melt and the mixture allowed to react for 15 minutes at 184° C. to 185° C. The product was then removed and cooled. Analysis by infrared indicated approximately 85% conversion to ester.

These examples illustrate the reaction of hydroxyl containing compounds with acrylic acid grafted polypropylene directly in the polymer melt and thus in the absence of any solvent as such. Depending upon the type of hydroxyl compound used, the product of this type of esterification could be useful as having improved polymer properties over the starting polymer or it could be useful as an additive in polypropylene to improve stability, antistatic properties, etc., where it is desirable to have a nonextractable, soluble additive with very low volatility.

It is clear that other functional groups could be reacted with the graft polymer in an analogous manner.

The grafts, which have been esterified with plasticizer alcohols, can be subsequently used as a plasticizer per se. For instance, they could be blended with vinyl halide polymers such as PVC.

Such a blend would plasticize the PVC, but at the same time the ester linkages would prevent the plasticizer nucleous from evaporating or being extracted from the PVC matrix.

We claim:

1. A polymeric composition of matter comprising polypropylene having pendant

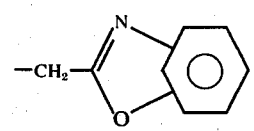

groups, which has been obtained by extruder reaction of acrylic acid grafted propylene with O-aminophenol

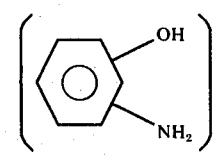

wherein the quality of said acrylic acid is from 2 to 10 wt. % based on the total weight of said grafted polymer and wherein said reaction has been carried out in the melt phase of said grafted polypropylene.

* * * * *